(12) United States Patent
Zheng et al.

(10) Patent No.: US 10,374,865 B2
(45) Date of Patent: Aug. 6, 2019

(54) SYSTEM FOR PROCESSING STREAMING MEDIA SERVICE AND METHOD AND NETWORK DEVICE THEREOF

(71) Applicant: HUAWEI TECHNOLOGIES CO., LTD., Shenzhen, Guangdong (CN)

(72) Inventors: Hewen Zheng, Nanjing (CN); Jitao Liu, Shenzhen (CN); Jian Cheng, Nanjing (CN); Xingfen Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 331 days.

(21) Appl. No.: 14/043,060

(22) Filed: Oct. 1, 2013

(65) Prior Publication Data
US 2014/0040500 A1 Feb. 6, 2014

Related U.S. Application Data

(63) Continuation of application No. PCT/CN2012/072710, filed on Mar. 21, 2012.

(30) Foreign Application Priority Data

Apr. 1, 2011 (CN) .......................... 2011 1 0082277

(51) Int. Cl.
*H04L 29/06* (2006.01)
*H04L 29/14* (2006.01)
(Continued)

(52) U.S. Cl.
CPC .... *H04L 29/06517* (2013.01); *H04L 65/4069* (2013.01); *H04L 65/4076* (2013.01);
(Continued)

(58) Field of Classification Search
CPC ............... H04L 65/4084; H04L 65/605; H04L 29/06517; H04L 69/40
See application file for complete search history.

(56) References Cited

U.S. PATENT DOCUMENTS 8,769,614 B1 * 7/2014 Knox ...................... H04L 63/08
726/3
2004/0177267 A1 9/2004 Tada et al.
(Continued)

FOREIGN PATENT DOCUMENTS

CN 1498499 A 5/2004
CN 101321280 A 12/2008
(Continued)

OTHER PUBLICATIONS

Joseph Thomas-Kerr et al., IEEE Transactions on Multimedia, "Format-Independent Rich Media Delivery Using the Bitstream Binding Language," vol. 10, No. 3, Apr. 2008.*
(Continued)

*Primary Examiner* — Scott B Christensen
(74) *Attorney, Agent, or Firm* — Staas & Halsey LLP (57) ABSTRACT

A system for processing a streaming media service and a method and a network device thereof are provided. The system includes a network device and an encoder. The network device has an embedded streaming function module. The encoder includes two egress ports, where the two egress ports of the encoder are connected to an active input port and a standby input port of the network device respectively. The encoder is configured to: receive a streaming media service signal, encode the streaming media service signal to generate a streaming media service coded signal, and send the streaming media service coded signal to the network device. The network device is configured to receive, by using the embedded streaming function module through the active input port or the standby input port, a
(Continued)

streaming media service coded signal sent by the encoder, and provide the streaming media service coded signal for a terminal.

10 Claims, 7 Drawing Sheets

(51) Int. Cl.
    *H04N 21/24*     (2011.01)
    *H04N 21/238*     (2011.01)
    *H04N 21/6437*     (2011.01)

(52) U.S. Cl.
    CPC ........ *H04L 65/4084* (2013.01); *H04L 65/605* (2013.01); *H04L 69/40* (2013.01); *H04N 21/238* (2013.01); *H04N 21/2404* (2013.01); *H04N 21/6437* (2013.01)

(56) References Cited

U.S. PATENT DOCUMENTS

| | | | |
|---|---|---|---|
| 2006/0029108 | A1 | 2/2006 | Miura et al. |
| 2009/0003600 | A1 | 1/2009 | Chen et al. |
| 2009/0089535 | A1 | 4/2009 | Lohmar et al. |
| 2010/0115051 | A1* | 5/2010 | Robert .............. G06F 17/30979 709/217 |
| 2012/0105637 | A1* | 5/2012 | Yousefi ................. H04N 7/183 348/148 |
| 2012/0244861 | A1 | 9/2012 | Agarwal et al. |
| 2014/0040216 | A1 | 2/2014 | Thomas et al. |

FOREIGN PATENT DOCUMENTS

| | | | |
|---|---|---|---|
| CN | 101416526 | A | 4/2009 |
| CN | 101471855 | A | 7/2009 |
| CN | 101589634 | A | 11/2009 |
| CN | 101640664 | | 2/2010 |
| CN | 101640664 | A * | 2/2010 |
| CN | 1016902237 | A | 4/2010 |
| CN | 101841432 | A | 9/2010 |
| WO | WO 02/097584 | A2 | 12/2002 |
| WO | 2010/128962 | A1 | 11/2010 |

OTHER PUBLICATIONS

PCT International Search Report and Written Opinion of the International Searching Authority dated Jun. 28, 2012 in corresponding International Application No. PCT/CN2012/072710.
Chinese Search Report dated Aug. 16, 2013 in corresponding Chinese Application No. 201110082277.X.
D. Hoffman et al., "RTP Payload Format for MPEG1/MPEG2 Video", Network Working Group, RFC2250, Obsoletes: 2038, Standards Track, Jan. 1998, pp. 1-15.
"Digital Video Broadcasting (DVB); Measurement Guidelines for DVB Systems", ETSI TR 101 290 V1.2.1, May 2001, pp. 1-175.
Cyril Concolato et al., "GPAC, Open Source Multimedia Framework", paper presented at the *15th International Conference on Multimedia (Mulitmedia '07)*, Sep. 23-28, 2007, pp. 1009-1012, Augsburg, Bavaria, Germany.
Ian Burnett et al., "Format-Independent Rich Media Delivery Using the Bitstream Binding Language", *IEEE Transactions on Multimedia*, Apr. 2008, pp. 514-522, vol. 10, No. 3.
Carsten Griwodz et al., "Low Overhead Container Format for Adaptive Streaming", paper presented at the *First Annual ACM SIGMM Conference on Multimedia Systems (MMSys '10)*, Feb. 22-23, 2010, pp. 193-198, Pheonix, Arizona, U.S.A.
Pedro Debevere et al., "Format-Independent Media Delivery, Applied to RTP, MP4, and OGG", paper presented at the *2010 4th International Conference Multimedia and Ubiquitous Engineering (MUE)*, Aug. 11-13, 2010, pp. 1-6, Cebu, Philippines.
Extended European Search Report dated Apr. 29, 2014, in corresponding European Patent Application No. 12764393.0.
International Search Report, dated Jun. 28, 2012, in corresponding International Application No. PCT/CN2012/072710 (6 pp.).
Chinese Office Action dated Sep. 28, 2014 in corresponding Chinese Patent Application No. 201280012920.4.
Chinese Search Report dated Sep. 4, 2014 in corresponding Chinese Patent Application No. 2012800129204.
European Communication of Notice of Opposition dated Jun. 6, 2016 in corresponding European Patent Application No. 12764393.0.
"Changing of file format without reencoding.", VideoCharge Studio, 2010 Video Charge Software Retrieved from web: http://web.archive.org/web/20100307092216/http://videocharge.com/Products/vcs/doc/changing_format_video_without_reencoding.php, May 24, 2016, 2 pages.

* cited by examiner

SYSTEM FOR PROCESSING STREAMING MEDIA SERVICE AND METHOD AND NETWORK DEVICE THEREOF

CROSS-REFERENCE TO RELATED APPLICATIONS

This application is a continuation of International Application No. PCT/CN2012/072710, filed on Mar. 21, 2012, which claims priority to Chinese Patent Application No. 201110082277.X, filed on Apr. 1, 2011, both of which are hereby incorporated by reference in their entireties.

FIELD

Embodiments of the present invention relate to the field of communications, and in particular, to a system for processing a streaming media service and a method and a network device thereof.

BACKGROUND

With the continuous development of network technologies and dramatic improvement in terminal capabilities, a network-based streaming media service, for example, audio and video services, is witnessing robust growth.

To address the competition pressures from the streaming media service, operators have launched multi-screen integrated services and built a system for processing a streaming media service, so that live program contents are transmitted by using different modes according to different terminal types. For example, for a traditional set top box (STB) terminal, live program contents may be transmitted by using Moving Pictures Experts Group 2-Transport Stream over Real-Time Transport Protocol (MPEG2-TS over RTP). For other terminals such as smart phones, netbooks, computers, and the like, live program contents may be transmitted by using the Hypertext Transfer Protocol (HTTP) technology.

A large number of servers and switches are needed in the system for processing a streaming media service, which makes the network architecture more complicated, thereby increasing operating costs.

SUMMARY

Embodiments of the present invention provide a system for processing a streaming media service and method and network device thereof to simplify the network architecture and reduce operating costs.

An embodiment of the present invention provides a system for processing a streaming media service, including a network device and an encoder. The network device has an embedded streaming function module and the encoder includes two egress ports, where the two egress ports of the encoder are connected to an active input port and a standby input port of the network device respectively.

The encoder is configured to: receive a streaming media service signal, encode the streaming media service signal to generate a streaming media service coded signal, and send the streaming media service coded signal to the network device.

The network device is configured to: receive, by using the embedded streaming function module through the active input port or the standby input port, the streaming media service coded signal sent by the encoder and provide the streaming media service coded signal for a terminal.

An embodiment of the present invention provides a network device, where the network device has an embedded streaming function module.

The network device is configured to: receive, by using the embedded streaming function module through an active input port or a standby input port, a streaming media service coded signal sent by an encode; and provide the streaming media service coded signal for a terminal.

In the foregoing embodiments of the present invention, a streaming function module is embedded in a network device, so that the network device may directly receive a streaming media service coded signal sent by an encoder, which does not need network deployment of Ethernet switches and streaming servers, thereby simplifying the network architecture and reducing operating costs.

An embodiment of the present invention provides a method for detecting and handling a fault in the foregoing system, including:

receiving, by a streaming function module embedded in a network device through a first input port, a streaming media packet sent by an encoder;

checking, by the streaming function module embedded in the network device, whether the encoder is faulty according to the streaming media packet;

if the encoder is faulty, switching, by the streaming function module embedded in the network device, the input port from the first input port to a second input port, and receiving the streaming media packet on the second input port.

The first input port is an active input port and the second input port is a standby input port; or, the first input port is the standby input port and the second input port is the active input port.

According to the foregoing embodiments of the present invention, whether an encoder is faulty may be detected by using a multimedia packet, and when the encoder is faulty, an active input port is switched to a standby input port to receive multimedia packets, so that the system may be maintained immediately and effectively.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person having ordinary skill in the art may still derive other drawings from these accompanying drawings without creative efforts.

DETAILED DESCRIPTION OF THE EMBODIMENTS

The following embodiments describe the specific implementation process of the present invention with the help of examples. Apparently, the described embodiments below are merely a part rather than all of the embodiments of the present invention. All other embodiments obtained by a person having ordinary skill in the art based on the embodiments of the present invention without creative efforts shall fall within the protection scope of the present invention.

Figure 1:
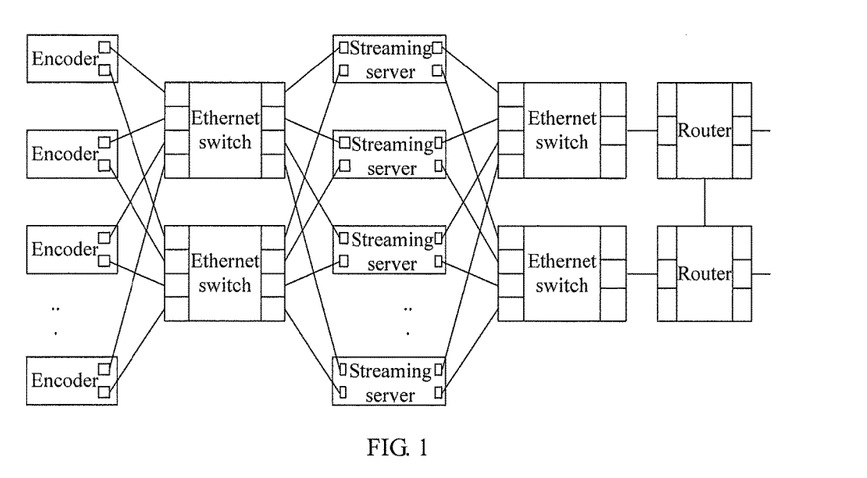
FIG. 1 is a schematic structural diagram of a system for processing a streaming media service in the prior art.

FIG. 1 is a schematic structural diagram of a system for processing a streaming media service in the conventional technology. As shown in FIG. 1, the system includes multiple encoders, four Ethernet switches, multiple streaming servers, and two routers, where each encoder has two egress ports which are connected to ingress ports of two Ethernet switches respectively; an egress port of one Ethernet switch is connected to one ingress port of each streaming server, and an egress port of the other Ethernet switch is connected to the other egress port of each streaming server; two egress ports of each streaming server are connected to the ingress ports of the other two Ethernet switches respectively, and the egress ports of these two Ethernet switches are connected to a router respectively.

Specifically, the encoders may receive a raw video signal from a video source signal receiver, and each encoder may output two identical coded streams for the same program, where the output coded stream is streaming media packets in multicast mode, and each program corresponds to a unique multicast group address. Considering the redundancy, two identical streams corresponding to the same program may be sent to network interfaces, that is, the ingress ports, on two different Ethernet switches; the streaming servers are connected to the encoders through the Ethernet switches, and join a corresponding multicast group to receive live program streams. The streaming servers are connected respectively to two different Ethernet switches by using two network cards, that is, two ingress ports, where one network card serves as an active network card and the other serves as a standby network card and only one network card joins the multicast group at one time; after receiving the live program streams sent by the encoders, the streaming servers perform scrambling according to a set rule, add an RTP packet header, and then cache the RTP packet and output a multicast RTP packet to downstream Ethernet switches, with the multicast address remaining unchanged; after receiving the multicast live program streams, the downstream Ethernet switches multicast the live program streams according to a multicast group subscription relationship to the downstream. The multicast group subscription relationship herein refers to a one-to-many mapping relationship between the multicast group and members joining the multicast group.

It can be seen from the above descriptions that the existing system for processing a streaming media service needs a large number of streaming servers and switches and has a complicated networking.

Figure 2:
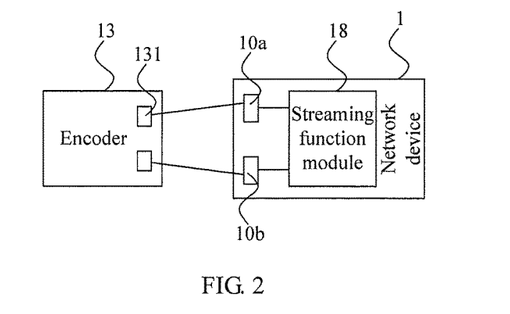
FIG. 2 is a schematic structural diagram of an embodiment of a system for processing a streaming media service in the present invention.

FIG. 2 is a schematic structural diagram of an embodiment of a system for processing a streaming media service in the present invention. As shown in FIG. 2, the system provided in this embodiment may include a network device 1 and an encoder 13. The network device 1 has an embedded streaming function module 18, and the encoder 13 includes two egress ports 131 which are connected to an active input port 10a and a standby input port 10b of the network device 1 respectively. The encoder 13 is configured to: receive a streaming media service signal, encode the streaming media service signal to generate a streaming media service coded signal, and send the streaming media service coded signal to the network device 1; the network device 1 is configured to receive, by using the embedded streaming function module 18 through the active input port 10a or the standby input port 10b, the streaming media service coded signal sent by the encoder 13, and provide the streaming media service coded signal for a terminal.

For example, the streaming function module may have various functions of the existing streaming server, where the functions at least include:

decapsulating a received packet to obtain media streams, where the decapsulation may include decapsulating the network layer, for example, removing an Internet Protocol (IP) header; decapsulating a transport layer header, for example, decapsulating a Transmission Control Protocol (TCP) header or a User Datagram Protocol (UDP) header; and decapsulating an application layer, for example, removing a Real-time Transport Protocol (RTP) header;

if media streams obtained by decapsulation are scrambled or encrypted, performing corresponding descrambling or decryption operation on the scrambled or encrypted media streams to obtain a plain text of the media streams, which needs to consider the adaptability of a scrambling algorithm, code conversion, and container conversion oriented to a next receiver, for example, the terminal;

performing code conversion for the descrambled media streams, where the code conversion includes conversion of an audio video coding mechanism, for example, converting a video code from MPEG-2 to H.264, changing a bit rate, the input stream is from 2 Mbps to 200 Kbps, which needs to consider the adaptability of audio video decoding capability, adaptability of access line rate, and the like of a next receiver, for example, the terminal;

scrambling or decrypting live streaming media according to a preset rule, for example, scrambling or encrypting copyright contents, and not scrambling non-copyrighted or specified contents;

encapsulating the live streaming media according to specifications, including encapsulating the application layer, for example, adding an RTP header according to the specifications, encapsulating the transport layer header, for example, adding a TCP header or a UDP header according to the specifications, and encapsulating the network layer, for example, adding an IP header according to the specifications; and performing traffic shaping according to a preset rule, for example, matching the bit rates of the live streaming media, and then sending the streaming media.

Specifically, for the existing system shown in FIG. 1, Ethernet switches of the first layer perform the function of converging coded streams sent by each encoder and sending each coded stream to each streaming server accordingly; Ethernet switches of the second layer perform the function of converging service streams sent by each streaming server and sending each traffic stream to a downstream router by using the same egress. Therefore, the Ethernet switches of the two layers perform the same function of converging and sending streams without other special functions, and can be omitted. Therefore, in this embodiment, a new network device is used, in which a streaming function module is embedded, so that the network device may directly receive a streaming media service coded signal sent by the encoder, which does not need network deployment of Ethernet switches and streaming servers, thereby simplifying the network architecture and reducing operating costs.

The following describes the technical solution of the present invention in detail with reference to several specific embodiments.

Figure 3:
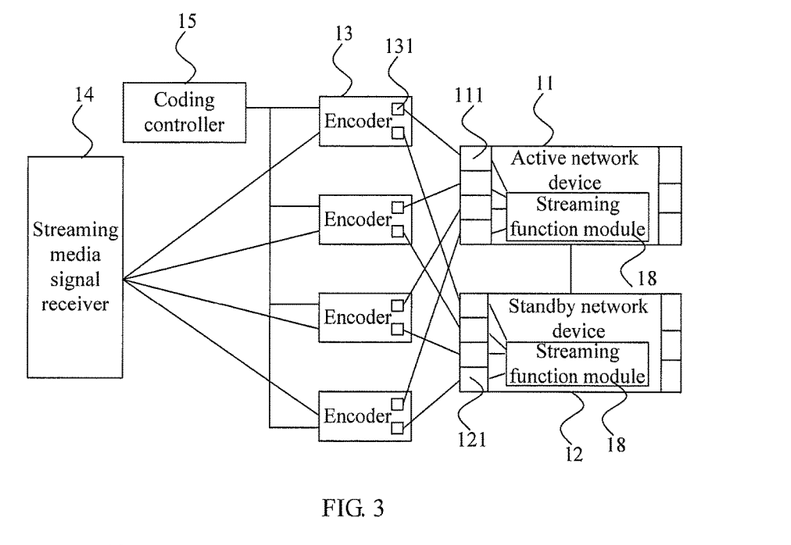
FIG. 3 is a schematic structural diagram of another embodiment of a system for processing a streaming media service in the present invention.

FIG. 3 is a schematic structural diagram of another embodiment of a system for processing a streaming media service in the present invention. As shown in FIG. 3, the system provided in this embodiment is based on the system shown in FIG. 2; further, the network device 1 may include an active network device 11 and a standby network device 12, and the number of encoders 13 is at least two. This embodiment is based on the example that the number of encoders 13 is four; the active network device 11 includes the same number of ingress ports 111 as the number of encoders 13, and the standby network device 12 includes the same number of ingress ports 121 as the number of encoders 13. This embodiment is based on the example that there are four ingress ports 111 and four ingress ports 121. The ingress ports 111 on the active network device 11 are active input ports, and the ingress ports 121 on the standby network device 12 are standby input ports; one egress port 131 of each encoder 13 is connected to one of the ingress ports 111 of the active network device 11, and the other egress port 131 of each encoder 13 is connected to one of the ingress ports 121 of the standby network device 12. In addition, the system provided in this embodiment may further include a streaming media signal receiver 14 and an coding controller 15, where the streaming media signal receiver 14 is configured to: receive a streaming source signal, decode the streaming source signal to obtain a streaming media service signal, and send the streaming media service signal to each encoder 13; the coding controller 15 is configured to control each encoder 13 to encode the streaming media service signal.

The active network device 11 and the standby network device 12 provided in this embodiment may be routers, and the routers need to include at least multiple ingress ports and one egress ports.

In this embodiment, a router may be used as a network device; a streaming function module is embedded in an active router and a standby router, so that the active router and the standby router may directly receive a streaming media service coded signal sent by each encoder, which does not need network deployment of Ethernet switches of the two layers and multiple streaming servers, thereby simplifying the network architecture and reducing operating costs.

Figure 4:
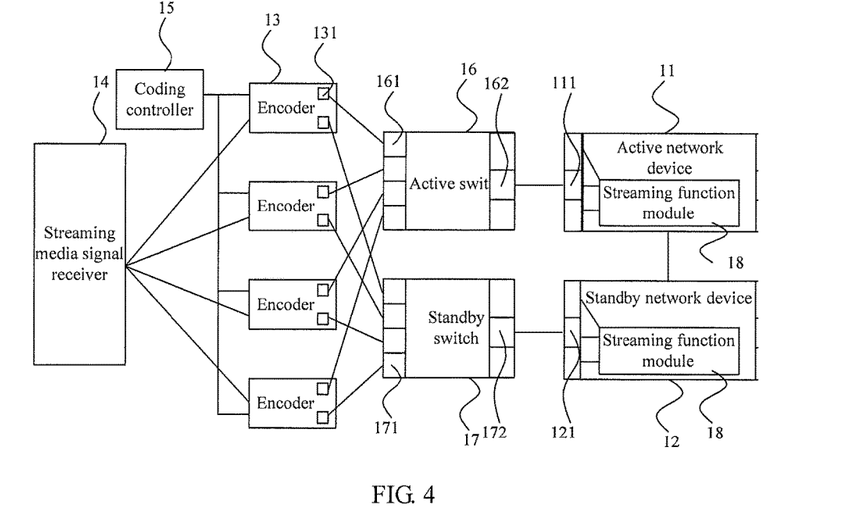
FIG. 4 is a schematic structural diagram of still another embodiment of a system for processing a streaming media service in the present invention.

FIG. 4 is a schematic structural diagram of still another embodiment of a system for processing a streaming media service in the present invention. As shown in FIG. 4, on the basis of the system shown in FIG. 2, the system provided in this embodiment further includes an active switch 16 and a standby switch 17; a network device 1 may include an active network device 11 and a standby network device 12, and the number of encoders 13 is at least two. This embodiment is based on the example that the number of encoders 13 is four. The active switch 16 includes the same number of ingress ports 161 as the number of encoders 13 and an egress port 162; the standby switch 17 includes the same number of ingress ports 171 as the number of encoders 13 and an egress port 172; the active network device 11 includes an ingress port 111, and the standby network device 12 includes an ingress port 121; the ingress port 111 on the active network device 11 is the active input port, and the ingress port 121 on the standby network device 12 is the standby input port; each ingress port 161 on the active switch 16 is connected to one egress port 131 on each encoder 13 respectively, and each ingress port 171 on the standby switch 17 is connected to the other egress port 131 on one encoder 13 respectively; the egress port 162 on the active switch 16 is connected to the ingress port 111 on the active network device 11, and the egress port 172 on the standby switch 17 is connected to the ingress port 121 on the standby network device 12. The system provided in this embodiment may further include a streaming media signal receiver 14 and an coding controller 15, where the streaming media signal receiver 14 is configured to: receive a streaming source signal, decode the streaming source signal to obtain a streaming media service signal, and send the streaming media service signal to each encoder 13; the coding controller 15 is configured to control each encoder 13 to encode the streaming media service signal.

The active network device 11 and the standby network device 12 in this embodiment may each be a router, but the router in this embodiment is different from the router shown in FIG. 3 in that: The router in this embodiment may have only one ingress port, while switches of one layer are added to converge a coded signal sent by the encoder 13. Therefore, this embodiment is applicable to cases that the router has a limited number of ingress ports. The switch in this embodiment may be, for example, an Ethernet switch.

In this embodiment, a router is used as a network device, and switches of one layer are added at the front end of the router to converge a coded signal sent by an encoder; a streaming function module is embedded in an active router and a standby router, so that the active router and the standby router may receive a streaming media service coded signal sent by each encoder, which does not need network deployment of Ethernet switches of one layer and multiple streaming servers, thereby simplifying the network architecture and reducing operating costs.

Figure 5:
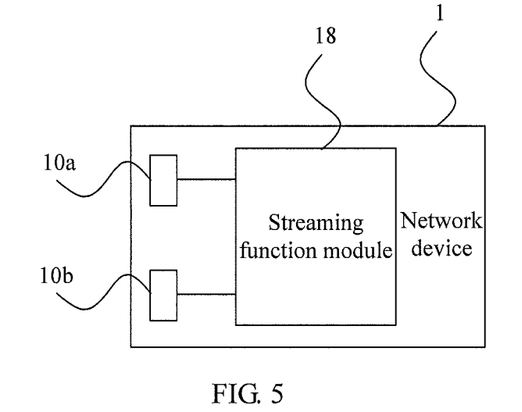
FIG. 5 is a schematic structural diagram of an embodiment of a network device in the present invention.

FIG. 5 is a schematic structural diagram of an embodiment of a network device in the present invention. As shown in FIG. 5, a network device 1 in this embodiment has an embedded streaming function module 18. The network device 1 is configured to receive, by using the embedded streaming function module 18 through an active input port 10a and a standby input port 10b respectively, a streaming media service coded signal sent by encoders, and provide the streaming media service coded signal for a terminal. For example, the network device may be a router.

The network device in this embodiment may be used as the network device shown in FIG. 2, or the active network device and the standby network device in the system shown in FIG. 3 and FIG. 4. The implementation principles and technical effects of the network device are similar to the implementation principles and technical effects of any one of the embodiments illustrated in FIG. 2 to FIG. 4, and are not further described herein.

An embodiment of the present invention provides a method for detecting and handling a fault. The method may be applied not only in the system architecture of the conventional technology shown in FIG. 1, but also in the system structure provided in embodiments of the present invention shown in FIG. 2 to FIG. 4, so as to check whether the encoder is faulty and perform corresponding active/standby switchover when the encoder is faulty. The following describes in detail the method for detecting and handling a fault of the present invention based on the system architecture provided in embodiments of the present invention.

Figure 6:
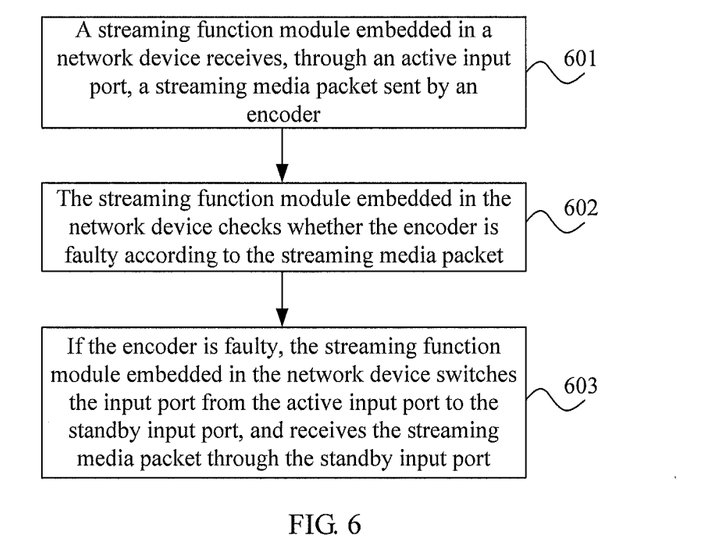
FIG. 6 is a flowchart of an embodiment of a method for detecting and handling a fault in the present invention.

FIG. 6 is a flowchart of an embodiment of a method for detecting and handling a fault in the present invention. As shown in FIG. 6, the method in this embodiment may be based on the system architecture shown in FIG. 2, and may include:

Step 601: A streaming function module embedded in a network device receives, through an active input port, a streaming media packet sent by an encoder.

The network device in this embodiment may be the network device shown in FIG. 2, on which an active input port and a standby input port are deployed, and also may be the active network device and the standby network device shown in FIG. 3 or FIG. 4, where the active input port is deployed on the active network device and the standby input port is deployed on the standby network device. This embodiment is based on the example that the first input port is the active input port, that is, the streaming function module receives a streaming media packet sent by the encoder through the active input port.

Step 602: The streaming function module embedded in the network device checks whether the encoder is faulty according to the streaming media packet.

For example, the streaming function module may detect whether the encoder is faulty by checking whether the streaming media packet matches container specifications that need to be complied with; if the streaming media packet matches the container specifications, the encoder is normal; otherwise, the encoder is faulty. For example, the streaming function module may receive an MPEG2-TS Single Program Transport Stream over User Datagram Protocol (MPEG2-TS SPTS over UDP) packet in multicast form; then the streaming function module may check whether the encoder is faulty by checking whether the load complies with the container specifications, for example, checking whether the MPEG2-TS SPTS complies with the European Telecommunications Standards Institute (ETSI) technical report (TR) 101 290 specification. If the load does not comply with the container specifications, the encoder is faulty.

Step 603: If the encoder is faulty, the streaming function module embedded in the network device switches the input port from the active input port to the standby input port, and receives the streaming media packet through the standby input port.

If detecting that the encoder is faulty, the streaming function module may switch to the standby input port to receive the multimedia packet. Optionally, the streaming function module may also generate an alarm to the management system.

It should be noted that for the system architecture in the conventional technology shown in FIG. 1, only the streaming function module embedded in the network device needs to be replaced with the streaming server shown in FIG. 1, while other implementation processes are similar and are not further described herein.

In addition, it is understandable by the skilled person that when the first input port is the standby input port, the implementation principles are similar except that the standby input port is switched back to the active input port in the case of switching.

In this embodiment, whether an encoder is faulty may be detected by using a multimedia packet; and when the encoder is faulty, an active input line is switched to a standby input line to receive the multimedia packet, so that the system may be maintained immediately and effectively.

For live services, in the system architecture of the conventional technology shown in FIG. 1, each streaming server has two network cards, that is, two input lines, and receives streams that are sent by the encoder in active/standby redundant mode. The streaming servers depend on these two network cards to implement fault detection and active/standby switchover in Ethernet lines/ports. Due to the limitation of the protocol stack architecture of the system, a fault in the Ethernet lines/ports is difficult to be detected by server applications; once the active network card is faulty, the streaming server can only depend on an Internet Group Management Protocol (IGMP) query message, that is periodically sent by the accessing Ethernet switch, to trigger the standby network card to send an IGMP report to join the multicast group, so as to obtain the data again. However, the IGMP query interval on the Ethernet switch is at least 5 seconds, which means that once the Ethernet lines/ports are faulty, image interruption or artifacts may last as long as 5 seconds.

Accordingly, on the basis of the embodiment of the method shown in FIG. 6, in this embodiment of the present invention, before receiving the streaming media packet sent by the encoder, the streaming function module embedded in the network device determines an input port for receiving the streaming media packet. Specifically, the network device may monitor whether the active input port for receiving the streaming media packet is normal; if the active input port for receiving the streaming media packet is normal, the network device may instruct the streaming function module to receive the streaming media packet through the active input port; otherwise, the network device may instruct the streaming function module to switch the input port from the active input port to the standby input port and receive the streaming media packet through the standby input port. In the specific implementation, the streaming function module may be registered in a link monitoring module in the network device; when detecting a link fault event, the link monitoring module of the network device may notify the streaming function module of the link fault event by using a message or a signal; or the streaming function module may also query current link status periodically.

Figure 7:
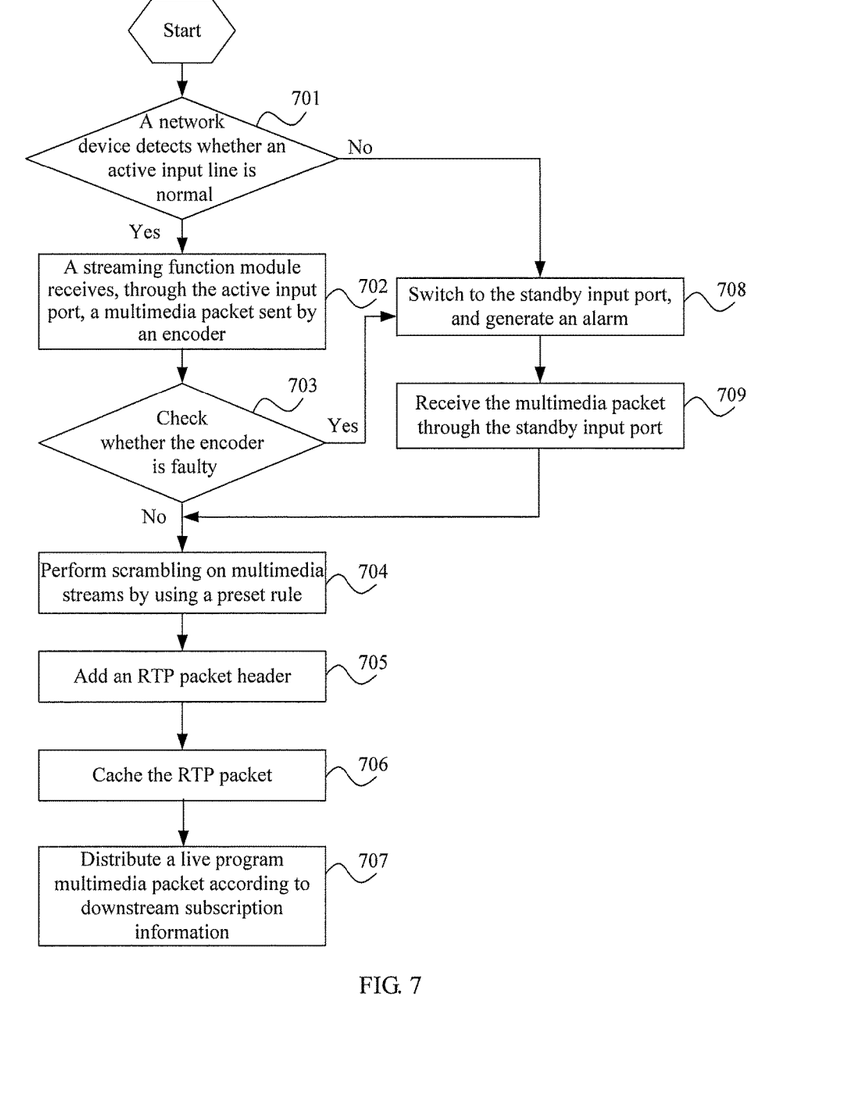
FIG. 7 is a flowchart of another embodiment of a method for detecting and handling a fault in the present invention.

FIG. 7 is a flowchart of another embodiment of a method for detecting and handling a fault in the present invention. As shown in FIG. 7, the method provided in this embodiment may include:

Step 701: A network device monitors whether an active input port is normal; if the active input port is normal, step 702 is performed; otherwise, step 708 is performed.

Step 702: A streaming function module receives, through the active input port, a multimedia packet sent by an encoder.

Step 703: The streaming function module checks whether the encoder is faulty according to the streaming media packet; if the encoder is faulty, step 708 is performed; otherwise, step 704 is performed.

For example, the streaming function module may check whether the streaming media packet matches container specifications of the terminal; if the streaming media packet matches the container specifications of the terminal, the encoder is normal; otherwise, the encoder is faulty. The checking process, for example, may be detecting whether a live video stream container output by the encoder complies with the ETSI TR 101 290 specification. Different encoders correspond to different container specifications, and therefore the contents checked by the streaming function module may be different accordingly.

Step 704: Perform scrambling on multimedia streams by using a preset rule.

Step 705: Add an RTP packet header.

Step 706: Cache the RTP packet.

Step 707: Distribute a live program multimedia packet according to downstream subscription information, and then the process ends.

Step 708: Switch to the standby input port, and generate an alarm.

Step 709: Receive the multimedia packet through the standby input port, and then perform step 704.

In this embodiment, for live services, a real-time fault detection mechanism of a physical line level of the network device is used to replace a traditional IGMP-based fault detection mechanism to trigger the active/standby switchover of single program multiple live streams. In this way, the fault switchover time is controlled at a millisecond level, which avoids impacts on the user experience due to the active/standby switchover. Because the repair effect of the existing packet loss repair mechanism depends on the buffer size of the STB and the buffer of the STB is generally 200 milliseconds, the collaboration of the millisecond-level line fault detection mechanism and the existing packet loss repair mechanism can prevent impacts on the user experience due to the packet loss in the active/standby switchover.

Conventionally, under a multimedia streaming media service, different terminals adopt different players, for example, a Silverlight player of Microsoft Corporation, an FLV player of Adobe Systems Incorporated, an MPEG2-TS player of Apple Inc., and the like. This requires the streaming server to support different containers as regards the program source of the same code, which means that the number of different copies of program sources on the streaming server needs to be the same as the number of containers, thereby causing extremely low storage efficiency.

Therefore, an embodiment of the present invention provides a method for processing a streaming media service. The method in this embodiment may meet the requirements of multiple containers so long as the streaming server in the conventional technology or the streaming function module provided in embodiments of the present invention stores a copy of the code source.

Specifically, the method for processing a streaming media service provided in this embodiment of the present invention includes:

receiving a streaming media service request message sent by a terminal, where the streaming media service request message includes a streaming media container type of the terminal;

if the streaming media container type is different from a container type of locally cached streaming media contents, converting the container type of locally cached streaming media contents into the streaming media container type of the terminal; and sending streaming media contents with the converted container type to the terminal.

The container type of locally cached streaming media contents is an intermediate format container type. Before the receiving a streaming media service request message sent by a terminal, the method further includes:

converting the container type of a streaming media packet sent by an encoder into the intermediate format container type;

the converting the container type of locally cached streaming media contents into the streaming media container type of the terminal includes:

converting the intermediate format container type into the streaming media container type of the terminal.

Before the receiving a streaming media service request message sent by a terminal, the method further includes:

receiving the streaming media contents that an encoder-oriented streaming server sends in unicast mode or multicast mode, and caching the streaming media contents.

Preferably, the receiving a streaming media service request message sent by a terminal includes:

receiving a streaming media service request message sent by a streaming media service controller, where the streaming media service request message is sent after the streaming media service controller redirects the streaming media service request message sent by the terminal.

Figure 8:
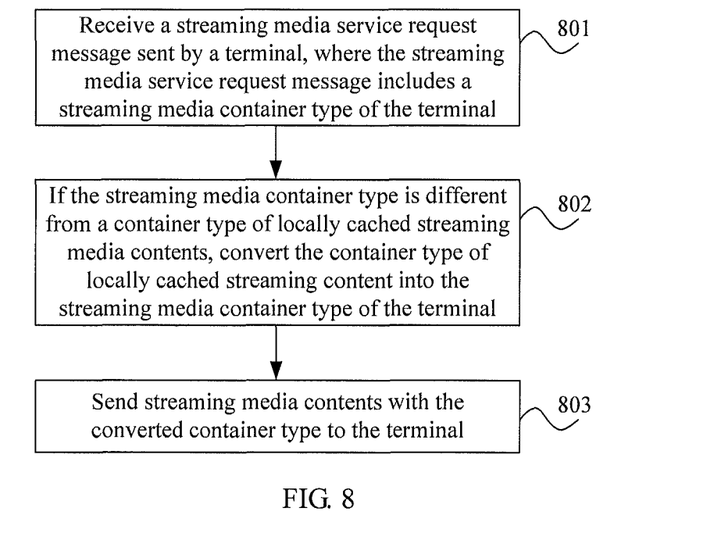
FIG. 8 is a flowchart of an embodiment of a method for processing a streaming media service in the present invention.

FIG. 8 is a flowchart of another embodiment of a method for processing a streaming media service in the present invention. As shown in FIG. 8, the method provided in this embodiment may include:

Step 801: Receive a streaming media service request message sent by a terminal, where the streaming media service request message includes a streaming media container type of the terminal.

Step 802: If the streaming media container type is different from a container type of locally cached streaming media contents, convert the container type of locally cached streaming media contents into the streaming media container type of the terminal.

Step 803: Send streaming media contents with the converted container type to the terminal.

Specifically, multimedia containers such as MPEG2-TS and MP4 carry coded multimedia streams, while the multimedia containers are carried over a streaming protocol. For different terminals, each code source may be encapsulated according to different containers, for example, a code source oriented to the MPEG2-TS container and a code source oriented to the MP4 container and the like are provided at the same time. Containers adopted by current mainstream multimedia streaming technologies are mainly produced by such companies as Microsoft, Apple, Adobe, and Move Network. Such containers are different in terms of type and format, though they carry the same audio video contents and even adopt the same coding format, for example, they all perform video coding and compression by using H.264. Containers refer to specifications to be complied with by media contents, and in essence, refer to organization of data needed to decode media, for example, audio and video, where the data includes: decoding parameters, for example, width, height, frame rate, and time synchronization information of a video screen; and media data, for example, coded and compressed audio video data. In some containers, for example, the ISMV container adopted by the Microsoft Silverlight player, part of decoding parameters are sent to the terminal by using an independent file description, while the MPEG2-TS container carries desired decoding parameters, that is, an additional file description is not needed, where the ismv, flv, and MPEG2-TS mainly include media data.

Therefore, to adapt to the streaming media container types of various terminals, streaming media contents corresponding to multiple streaming media container types are stored in the streaming media server in the conventional technology or in the streaming function module provided in embodiments of the present invention.

In comparison, this embodiment may reduce, by using a real-time container conversion technology, storage pressures imposed by different terminals on differentiation of the containers of streaming media contents. Specifically, the streaming server in the conventional technology or the streaming function module in the network device shown in FIG. 2 to FIG. 4 may store streaming media contents of only one container type. For different terminals, during the streaming, the streaming server or the streaming function module may perform real-time container conversion adaptively to provide a matching container, so that only one copy of streaming media contents is stored for multiple different container types.

For example, the streaming server or the streaming function module stores only the code source of the MPEG2-TS container, where the code source performs video coding and compression by using H.264. Then, the streaming server or the streaming function module may receive a streaming media service request message sent by the terminal, where the streaming media service request message includes a streaming media container type requested by the terminal, for example, the container type is a moving pictures experts group-version 4 part 14 (MPEG-4 Part 14, abbreviated as MP4). Therefore, the streaming server or the streaming function module may determine that the streaming media container type MP4 of the terminal is different from the container type MPEG2-TS of locally cached streaming media contents. Then, the streaming server or the streaming function module may convert the container type MPEG2-TS of locally cached streaming media contents into the streaming media container type MP4 requested by the terminal, and send the streaming media contents whose container is converted into the MP4 to the terminal. In this embodiment, the streaming media container types of the terminal may include the MPEG2-TS, the MP4, windows media video (WMV), and the ISMV, which are not limited in this embodiment.

The following is based on the example that the container type of locally cached streaming media contents is ISMV and the container type of the terminal is the MPEG2-TS. The ISMV container needs an independent media file description, that is, a manifest file, to describe decoding parameters of media, for example, video coding mechanism, height, width, and frame rate parameters of the screen, sequence parameter set (SPS) and picture parameter set (PPS) of H.264. The MPEG2-TS stores the decoding parameters and media data in the container, without the need of a file description.

Therefore, the conversion process of the container type may be as follows: The decoding parameters of media description are synchronized between the independent file description manifest of the ISMV and packet elementary stream (PES) or program special information (PSI) of the MPEG2-TS, for example, video coding mechanism, height, width, and frame rate parameters of the screen, SPS and PPS of H.264; such information as container version information and fragment sequence number is synchronized between a movie fragment header of the ISMV and the packet identifier (Packet Identifier, abbreviated as PID) of the MPEG2-TS; such information as fragment duration time, data length, data offset, and presentation time and sampling information is synchronized between a track fragment header, track fragment run, and a universally unique identifier (UUID) of the ISMV and program clock reference (PCR) and PES of the MPEG2-TS; and media data is synchronized between the media fragment data of the ISMV and the PES of the MPEG2-TS. Now the container type conversion may be completed.

Other container types may also be converted by using the method of the foregoing type, that is, such container related information as decoding parameters of media description, container version information, fragment sequence number, fragment duration time, data length, data offset, and presentation time, and media data is synchronized between two types of containers.

In this embodiment, for different terminals, the streaming server or the streaming function module may perform, during the streaming, real-time container conversion adaptively to provide a matching container, so that only one copy of streaming media contents is stored for multiple different container types, thereby reducing the storage pressure on the streaming server or the streaming function module.

Another embodiment of the method for processing a streaming media service is different from the method embodiment shown in FIG. 8 in that: The container type of streaming media contents locally cached by the streaming server or the streaming function module is not the container type of any one terminal, that is, it is not such an existing container type as the MPEG2-TS or the MP4, but an intermediate format container type. Therefore, in this embodiment, the streaming server or the streaming function module does not need to judge whether the container type of the terminal is the same as the container type of locally cached streaming media contents, but must perform container conversion. The skilled person may design an intermediate format container type according to the needs, so as to reduce the storage pressure as much as possible or convert the container type into any one container type as conveniently as possible. Specific contents of the intermediate format container type are not limited by this embodiment.

Specifically, when the streaming server or the streaming function module stores streaming media contents locally, it may convert an original container type of the streaming media contents into an intermediate format container type. This embodiment is based on the example that the original container type of the streaming media contents is ISMV and the intermediate format container adopts an independent file description. The conversion process may be as follows: The decoding parameters of the media description are synchronized between the independent file description manifest of the ISMV and the media file description of the intermediate format container, for example, video coding mechanism, height, width, and frame rate parameters of the screen, SPS and PPS of H.264; such information as container version information and fragment sequence number is synchronized between the movie fragment header of the ISMV and the media fragment header of the intermediate format container; such information as fragment duration time, data length, data offset, and presentation time, and sampling information is synchronized between the track fragment header, the track fragment run, and the UUID of the ISMV and the rack fragment header and the track fragment record of the intermediate format container; media data is synchronized between the media fragment data of the ISMV and the media fragment data of the intermediate format container.

On the basis of the foregoing intermediate format container, if the container type of the terminal is the MPEG2-TS, the process of converting the intermediate format container type into the MPEG2-TS may be as follows: The decoding parameters of media description are synchronized between the media file description of the intermediate format container and the PES/PSI of the MPEG2-TS, for example, video coding mechanism, height, width, and frame rate parameters of the screen, and SPS and PPS of H.264; such information as container version information and fragment sequence number between the media file description of the intermediate format container and the PID of the MPEG2-TS; such information as fragment duration time, data length, data offset, and presentation time and sampling information is synchronized between the media file description of the intermediate format container and the PCR and the PES of the MPEG2-TS; and media data is synchronized between the media file description of the intermediate format container and the PES of the MPEG2-TS.

In the specific implementation process, the streaming server in the conventional technology or the streaming function module embedded in the network device provided in embodiments of the present invention may be decoupled into two parts: One part is oriented to the encoder and mainly prepares streaming media contents and formats, and the other part is oriented to the terminal and mainly performs distribution and controlling of streaming media. The encoder-oriented part is placed at a head end, while the terminal-oriented part is close to users. In addition, live programs are transmitted between the two parts by using a single session, while all live program sessions are terminated on the streaming server or the streaming function module oriented to the terminal users. Furthermore, the foregoing real-time container conversion function may be deployed on the streaming server or the streaming function module close to the terminal. Therefore, the encoder-oriented part does not need to consider the container type of the streaming media contents.

The following describes the foregoing technical solution in detail based on an existing system for processing a streaming media service.

Figure 9:
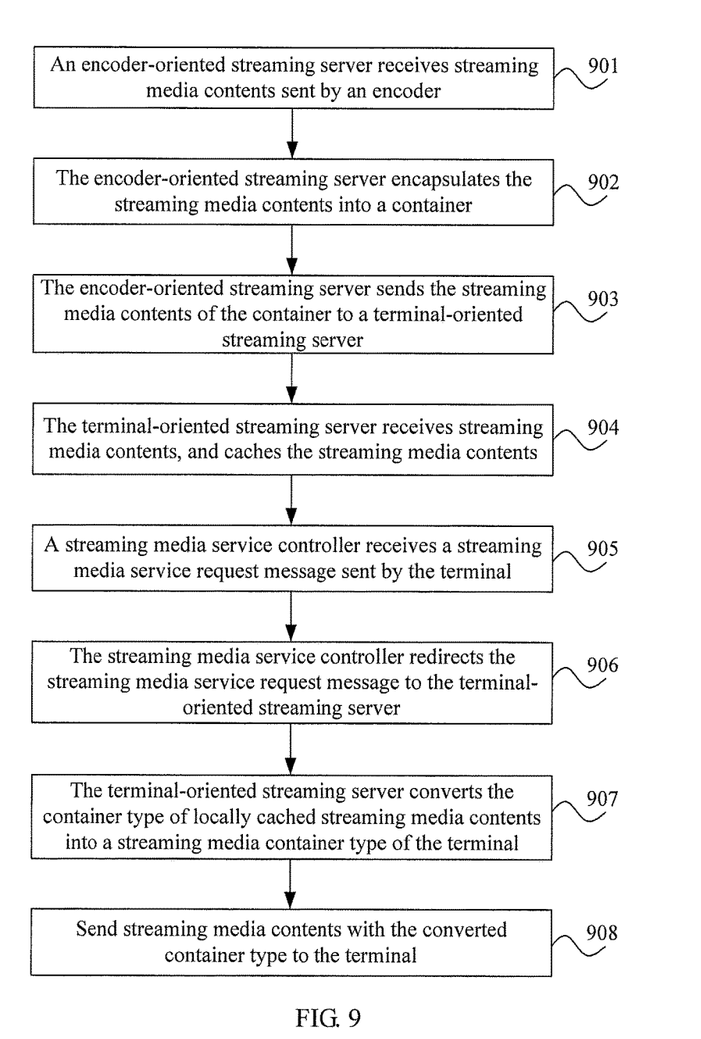
FIG. 9 is a flowchart of another embodiment of a method for processing a streaming media service in the present invention.

FIG. 9 is a flowchart of another embodiment of a method for processing a streaming media service in the present invention. As shown in FIG. 9, the method provided in this embodiment may include:

Step 901: An encoder-oriented streaming server receives streaming media contents sent by an encoder.

Specifically, the encoder may perform transcoding processing on a raw source to obtain streaming media contents. The transcoding processing may include coding format conversion, bit rate conversion, resolution conversion, and the like. Then, the encoder may send the streaming media contents to the encoder-oriented streaming server.

Step 902: The encoder-oriented streaming server encapsulates the streaming media contents into a container.

The encoder-oriented streaming server may complete the encapsulation in a single container, for example, creation and maintenance of packet sequence number. The container type may be an existing container type, for example, MP4, or an intermediate format container type.

Step 903: The encoder-oriented streaming server sends the streaming media contents of the container to a terminal-oriented streaming server.

The terminal-oriented streaming server is close to users, and keeps a single session on a single program with the encoder-oriented streaming server, where the session mode may be multicast or unicast mode. In this way, the network traffic between the terminal-oriented streaming server and the encoder-oriented streaming server is only in proportion to the number of programs, and is independent of the massive number of terminals.

Step 904: The terminal-oriented streaming server receives streaming media contents, and caches the streaming media contents.

The terminal-oriented streaming server may cache streaming media contents of a single container type locally.

Step 905: A streaming media service controller receives a streaming media service request message sent by the terminal.

The streaming media service controller may sessions between the user terminal and the terminal-oriented streaming media server.

Step 906: The streaming media service controller redirects the streaming media service request message to the terminal-oriented streaming server.

After receiving the streaming media service request message sent by the terminal, the streaming media service controller may redirect the streaming media service request message to the terminal-oriented streaming server.

Step 907: The terminal-oriented streaming server converts the container type of locally cached streaming media contents into a streaming media container type of the terminal.

The terminal-oriented streaming server may adapt to the container type of the terminal automatically, and perform real-time container conversion.

Step 908: Send streaming media contents with the converted container type to the terminal.

For the streaming function module embedded in the network device, its decoupled two parts may respectively correspond to the operations executed by the foregoing encoder-oriented streaming server and the terminal-oriented streaming server. The implementation principles of the streaming function module embedded in the network device are similar to those of the streaming server, and are not further described herein.

In this embodiment, on the basis of method embodiment illustrated in FIG. 8, further, a Layer-2 streaming function is designed, so that the network traffic between the terminal-oriented streaming server and the encoder-oriented streaming server is only in proportion to the number of programs and is irrelevant to the massive number of terminals, thereby increasing the utilization of network bandwidths.

Figure 10:
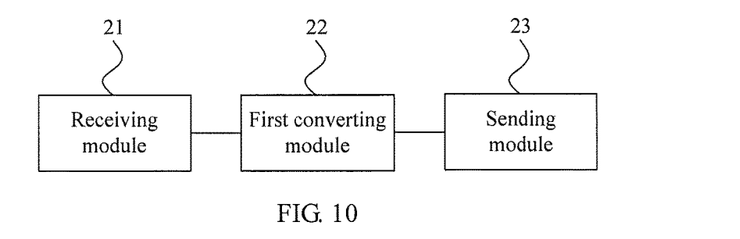
FIG. 10 is a schematic structural diagram of an embodiment of an apparatus for processing a streaming media service in the present invention.

FIG. 10 is a schematic structural diagram of an embodiment of an apparatus for processing a streaming media service in the present invention. As shown in FIG. 10, the apparatus provided in this embodiment may include a receiving module 21, a first converting module 22, and a sending module 23. The receiving module 21 is configured to receive a streaming media service request message sent by a terminal, where the streaming media service request message includes a streaming media container type of the terminal; the first converting module 22 is configured to convert a container type of locally cached streaming media contents into the streaming media container type of the terminal if the streaming media container type is different from the container type of locally cached streaming media contents; the sending module 23 is configured to send streaming media contents with the converted container type to the terminal.

The apparatus provided in this embodiment may be a streaming server or the network device having an embedded streaming function module shown in any one of FIG. 2 to FIG. 4. The apparatus provided in this embodiment may be configured to execute the method in the embodiment illustrated in FIG. 8. The implementation principles and technical effects of the apparatus are similar to those of the method and are not further described herein.

Figure 11:
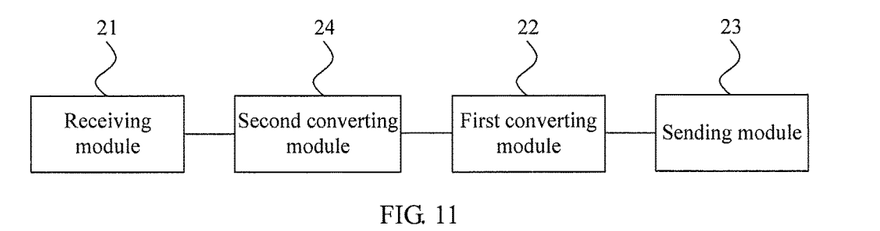
FIG. 11 is a schematic structural diagram of another embodiment of an apparatus for processing a streaming media service in the present invention.

FIG. 11 is a schematic structural diagram of another embodiment of an apparatus for processing a streaming media service in the present invention. As shown in FIG. 11, on the basis of the apparatus shown in FIG. 10, the apparatus provided in this embodiment further includes: a second converting module 24, where the second converting module 24 is configured to convert a container type of streaming media packets sent by an encoder into an intermediate format container type; and the first converting module 22, specifically configured to convert the intermediate format container type obtained by the second converting module 24 into the streaming media container type of the terminal.

The apparatus provided in this embodiment may be a streaming server or the network device having an embedded streaming function module shown in any one of FIG. 2 to FIG. 4. The apparatus provided in this embodiment may be configured to execute the method in the embodiment illustrated in FIG. 8. The implementation and technical effects of the apparatus are similar to those of the method and are not further described herein.

Figure 12:
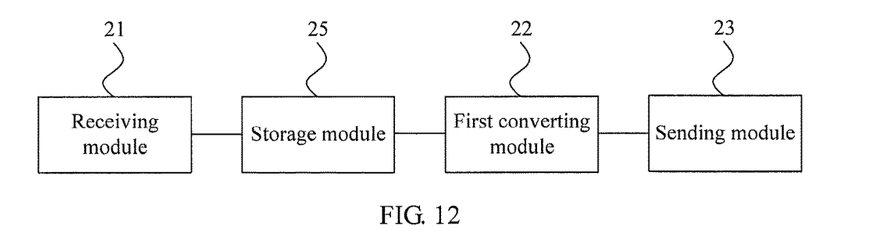
FIG. 12 is a schematic structural diagram of still another embodiment of an apparatus for processing a streaming media service in the present invention.

FIG. 12 is a schematic structural diagram of another embodiment of an apparatus for processing a streaming media service in the present invention. As shown in FIG. 12, on the basis of the apparatus shown in FIG. 10, the apparatus provided in this embodiment further includes a storage module 25. The receiving module 21 is specifically configured to receive streaming media contents that an encoder-oriented streaming server sends in unicast mode or multicast mode; and the storage module 25 is configured to cache the streaming media contents. The apparatus provided in this embodiment may be a terminal-oriented streaming server obtained after decoupling the streaming server shown in FIG. 1 or be a terminal-oriented streaming function module obtained after decoupling the streaming function module embedded in the network device shown in FIG. 2 to FIG. 4. The terminal-oriented streaming server or the terminal-oriented streaming function module may be deployed at one side oriented to the terminal.

The apparatus provided in this embodiment may be configured to execute the embodiment of the method for processing a streaming media service shown in FIG. 9. The implementation principles and technical effects of the apparatus are similar to those of the method and are not further described herein.

A person having ordinary skill in the art may understand that all or part of the steps of the method provided in the foregoing embodiments may be implemented by a program instructing relevant hardware. The program may be stored in a computer readable storage medium. When the program is run, the foregoing steps of the methods in the embodiments are performed. The storage medium may include various media that is capable of storing program code, such as a ROM, a RAM, a magnetic disk, or an optical disk.

The foregoing descriptions are merely exemplary specific embodiments of the present invention, but are not intended to limit the protection scope of the present invention. Any variation or replacement figured out by the skilled person within the technical scope disclosed in the present invention shall fall within the protection scope of the present invention. Therefore, the protection scope of the present invention shall be subject to the protection scope of the appended claims.

What is claimed is:

1. A method for processing a streaming media service, comprising:

receiving, by a network device, streaming media content in an encoder format container type and a single coding format;

first determining, by the network device, that the encoder format container type is different than an intermediate format container type of the network device;

caching, by the network device and responsive to the first determining, the streaming media content in the intermediate format container type, the cached streaming media content having only one version comprising the coding format to provide high efficiency of storage utilization in the network device;

receiving, by the network device, a streaming media service request message requesting the cached streaming media content,
wherein the streaming media service request message comprises a streaming media container type of a terminal;

second determining that the streaming media container type of the terminal is different than the intermediate format container type;

converting, by the network device responsive to the second determining, the intermediate format container type of the streaming media content into the streaming media container type of the terminal in real-time, the converting comprising
adapting information from a media file description of a container of the intermediate format container type of the streaming media content to a manifest of a container of the streaming media container type of the terminal while maintaining the cached coding format of the streaming media content without coding format converting,
wherein the network device is not configured to store or convert to different coding formats for any media content to provide the high efficiency of storage utilization in the network device; and sending, by a network device, the streaming media content with the coding format and the container type of the terminal to the terminal.

2. The method according to claim 1, wherein the streaming media content includes data carried via a streaming media packet, the method further comprises:
converting a container type of the streaming media packet sent by an encoder into the intermediate format container type.

3. The method according to claim 1, wherein the method further comprises:
receiving the streaming media content from an encoder-oriented streaming media server, wherein the streaming media content was sent in unicast mode or multicast mode; and
caching the streaming media contents.

4. The method according to claim 1, wherein the receiving a streaming media service request message comprises:
receiving a streaming media service request message sent by a streaming media service controller, wherein the streaming media service controller redirects the streaming media service request message sent by the terminal.

5. The method according to claim 1, wherein the information including decoding parameters of media description, container version information, fragment sequence number, fragment duration time, data length, data offset, presentation time, or media data.

6. The method according to claim 1, wherein only one copy of the streaming media content is cached in the intermediate format container type.

7. A network device for processing a streaming media service, comprising:
  a processor;
  a storage in communication with the processor; and
  a network port coupled to the processor, wherein the processor is configured to:
    receive streaming media content in an encoder format container type and in a single coding format;
    first determine that the encoder format container type is different than an intermediate format container type of the network device;
    cache the streaming media content in the intermediate format container type into the storage responsive to the first determine, the cached streaming media content having only one version comprising the coding format to provide high efficiency of storage utilization to the storage;
    receive a streaming media service request message requesting the cached streaming media content via the network port, wherein the streaming media service request message comprises a streaming media container type of a terminal;
    second determine that the streaming media container type of the terminal is different than the intermediate format container type;
    convert the intermediate format container type of the streaming media content into the streaming media container type of the terminal in real-time responsive to the second determine, the convert comprising adapt information from a media file description of a container of the intermediate format container type of the streaming media content to a manifest of a container of the streaming media container type of the terminal while maintaining the cached coding format of the streaming media content without coding format converting, wherein the network device is not configured to store or convert to different coding formats for any media content to provide the high efficiency of storage utilization in the network device; and
    send the streaming media content with the coding format and the container type of the terminal to the terminal via the network port.

8. The network device according to claim 7, wherein the processor is further configured to: convert a container type of a streaming media packet received from an encoder into the intermediate format container type.

9. The network device according to claim 7, wherein the network device includes one or more of an Ethernet switch, a streaming server, or a router.

10. The network device according to claim 7, wherein the processor is configured to: only one copy of the streaming media content is cached in the intermediate format container type in the storage.

* * * * *